United States Patent [19]
Gnage et al.

[11] Patent Number: 5,290,132
[45] Date of Patent: Mar. 1, 1994

[54] PLASTIC FLASH SCREW CLIP ARRANGEMENT

[75] Inventors: Douglas R. Gnage, Hilton; Robert R. Mura, Rochester; Gary J. De Angelis, Spencerport, all of N.Y.

[73] Assignee: General Motors Corporation, Detroit, Mich.

[21] Appl. No.: 16,443

[22] Filed: Feb. 11, 1993

[51] Int. Cl.$^5$ .............................................. F16B 21/00
[52] U.S. Cl. .................................. 411/512; 411/107; 411/999
[58] Field of Search ................ 411/512, 107, 999, 337

[56] References Cited

U.S. PATENT DOCUMENTS

| | | | |
|---|---|---|---|
| 3,853,381 | 12/1974 | Morningstar | 411/107 X |
| 4,396,327 | 8/1983 | Menke | 411/337 |
| 4,640,524 | 2/1987 | Sedlmair | 411/999 X |
| 5,082,407 | 1/1992 | Mickiewicz | 411/107 |

Primary Examiner—Rodney M. Lindsey
Attorney, Agent, or Firm—Ernest E. Helms

[57] ABSTRACT

A fastening arrangement for connecting a first member to a second member which has a threaded bore is provided which includes a bolt having a head on one end and an attached shank with a threaded portion, a flange connected with the first member, the flange having a support surface for supporting the bolt head, and a bore intersecting the support surface allowing for penetration of the bolt shank, the bore also having at least two radially inward protruding guides for centering the bolt shank within the bore, and at least one compliant finger integrally formed and connected with the flange which by insertion of the bolt is deformed to a position to compliantly bias the bolt shank against at least one of the guides and to also retain the bolt shank within the bore.

9 Claims, 1 Drawing Sheet

U.S. Patent
Mar. 1, 1994
5,290,132
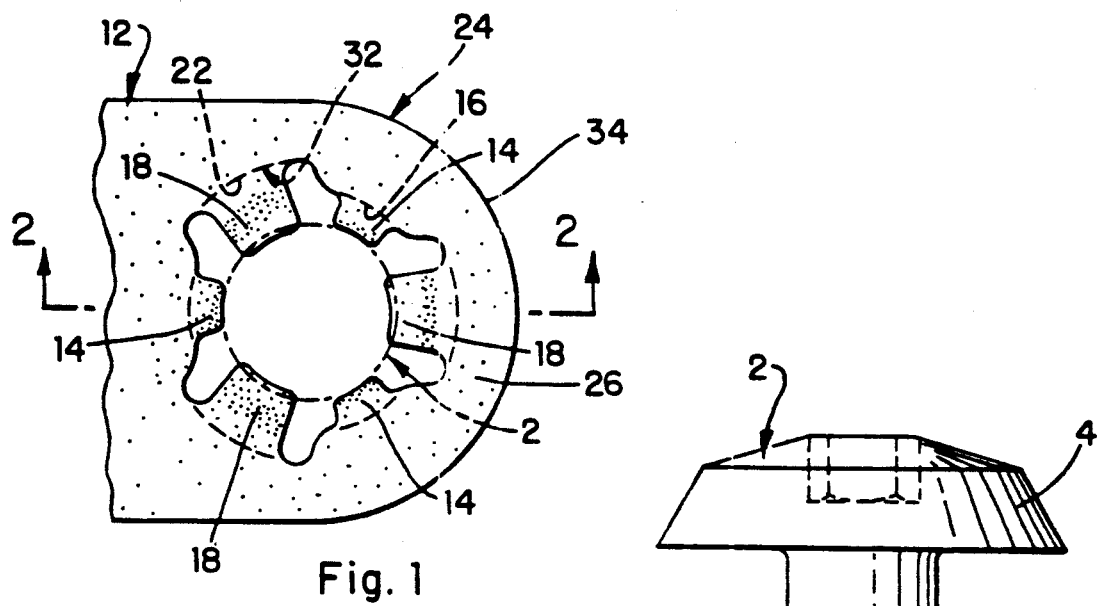
Fig. 1
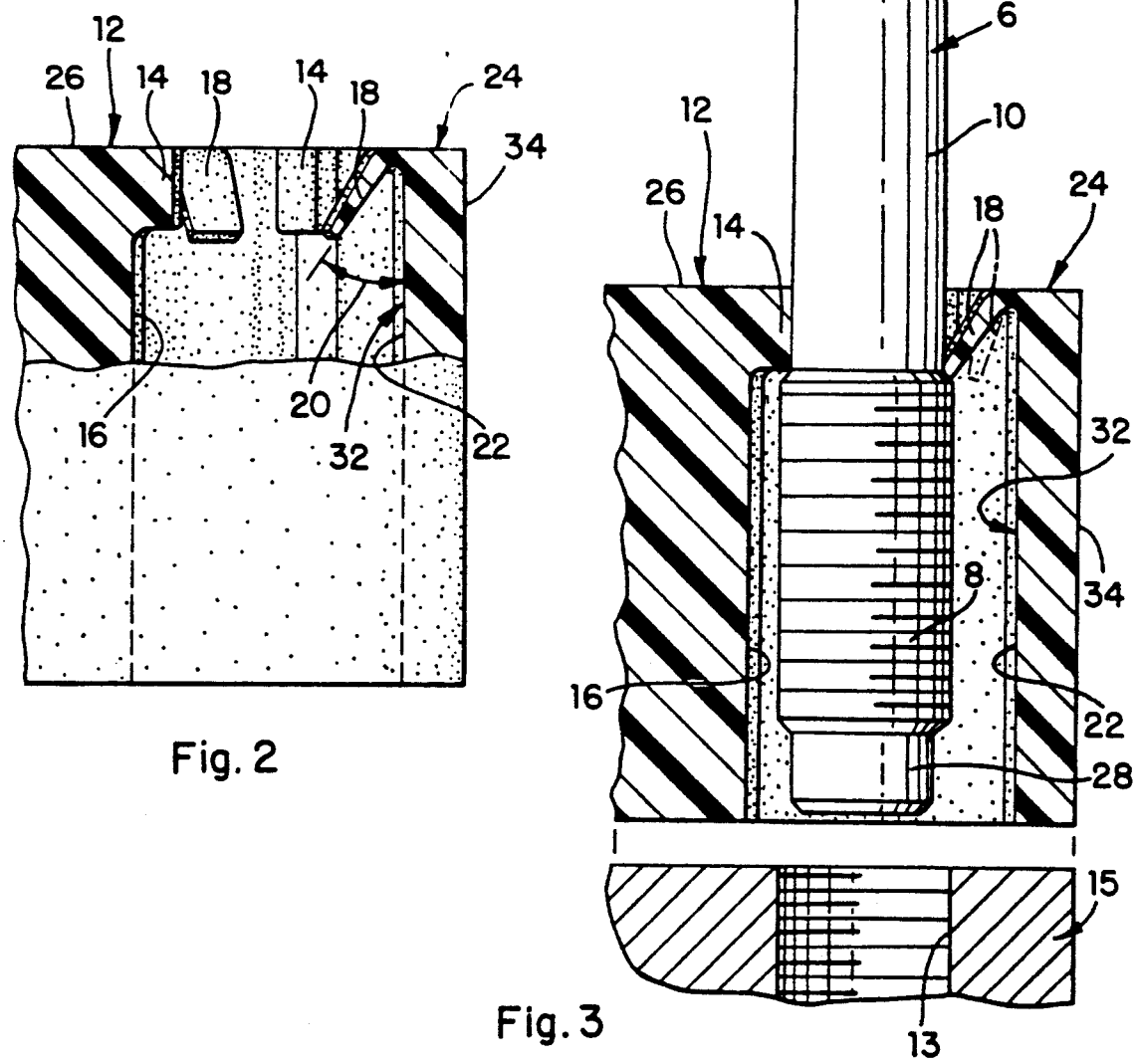
Fig. 2
Fig. 3

PLASTIC FLASH SCREW CLIP ARRANGEMENT

The field of the present invention is that of screw clips. More particularly, the present invention refers to screw clips useful in automotive applications wherein one member is fastened to a second member by a threaded fastener and the first member has means to retain the threaded faster before its assembly to the second member.

BACKGROUND OF THE INVENTION

It is well known in the automotive art to fasten one member to another member by a threaded fastener. When assembling parts where losing a fastener may cause major problems (especially when assembling engine components), it has often been the practice to retain fastener one member before that member is assembled to the second member to prevent the fastener from being misplaced. The above-noted practice is also desirable so that an assembler does not have to take the time to pick up the fastener when installing the component on a vehicle.

An example of the above practice is demonstrated in the attachment of air intake tubes to an engine manifold or head. The intake tubes, to meet the environmentally-mandated goal of reducing overall vehicle weight, are made of a glass fiber-impregnated polymeric material. The engine head or manifold is typically a metallic material. The attachment bolt has a head with a partially threaded shank. The intake tube has an integral flange which has a bore for insertion of the bolt. The bore has a metallic sleeve with a mushroom head which protrudes outside of the bore, away from the engine head or manifold. The sleeve is either pressed into the flange, adhesively inserted or placed in the mold when forming the air tube.

A C-clip having a bore for insertion of the shank of the bolt is first placed on the bolt shank adjacent the bolt head. The shank threads are then rolled. The rolling on the threads provides a thread outer diameter greater than the original stock portion of the shank. Therefore, the clip is retained on the bolt. The bolt shank is inserted within the sleeve, and the clip is then snapped onto the mushroom head. Thereafter, the bolt is retained with the intake tube.

SUMMARY OF THE INVENTION

Although the above method works in a technically superior fashion, there is always a desire to improve the product by providing that which can technically function in the same manner, yet at a reduced cost. The present invention provides an alternative fastening arrangement wherein the bolt may be retained to a first member without the requirement of a metallic sleeve or of a C-clip.

BRIEF DESCRIPTION OF THE DRAWINGS

FIG. 1 is a top plan view of a preferred embodiment fastening arrangement of the present invention.

FIG. 2 is a view taken along line 2—2 of FIG. 1.

FIG. 3 is a view similar to that of FIG. 2 demonstrating the invention after insertion of the bolt shank.

DESCRIPTION OF THE PREFERRED EMBODIMENTS

Referring to FIGS. 1 through 3, the fastening arrangement of the present invention includes a bolt 2 which has a head 4. The bolt has connected thereto a shank 6 having a threaded portion 8, a smooth portion 10 and a reduced diameter portion along its lower end 28. The threaded portion 8 will typically be rolled; therefore, it will have a slightly enlarged diameter as compared with the smooth portion of the shank 10. The reduced diameter portion 28 is reduced to help it align itself into a threaded bore 13 which is provided in a second member 15.

An integrally formed flange 24 of a first member 12 which is to be attached with the second member is also provided. The flange 24 is preferably fabricated from a moldable polymeric material and as shown is glass-impregnated nylon-66 (DuPont Zytel 70G-33HS1L BK31). The flange also has a support surface 26 for supporting the head 4 of the bolt or an appropriate washer, if so desired. Protruding radially inward to the above bore 32 from a first smaller inside diameter 16 are three geometrically spaced guide members 14. The guide members are provided to align the shank 6 of the bolt 2. The guide members 14 are on a first side of the bore 32 from the support surface 26.

Protruding from a second larger interior diameter 22 to the bore 32 are three geometrically spaced compliant flash fingers 18. Like the guide members 14, the fingers 18 are integrally formed with the flange 24. In normal circumstances as shown in FIG. 2, the fingers 18 project radially inward further than the guide members 14. The fingers 18 are on the same side of the bore 32 from the support surface 26 that the guide members are on (or, in other words, below support surface 26).

The fingers are tapered, having a thickness of approximately 0.5 mm at diameter 22, converging to a thickness of approximately 0.2 mm. The fingers are molded at an angle 20 approximately 65 degrees, plus or minus 10 degrees. Insertion of the bolt 2 causes the fingers 18 to bend to a deflected position approximately 0.2 mm radially outwardly and also cause the fingers to compliantly bias the bolt shank 6 against the guide members 14. The fingers 18 have a length such that they have a tendency to contact the bolt shank 6 at a vertical height away from the support surface 26 generally at the same distance as the length of the guide member 14.

Insertion of the bolt 2 within the bore 32 causes two advantages to be provided by the compliant fingers 18. The first advantage is that the fingers 18 will engage the threaded portion 8 of the bolt to prevent the bolt 2 from being withdrawn. Secondly, the fingers will hold the bolt 2 if desired at the top end of the threaded portion 8, thereby allowing the bolt to be shifted to align its reduced diameter portion 28 for insertion to the threaded bore 13 of the second member 15. Once the bolt 2 is pushed down further, the fingers 18 will engage upon the smooth upper portion 10 of the bolt shank 6 and travel will be relatively unencumbered. During a maintenance operation where the bolt 2 is torqued to release the first member 12, the bolt 2 will still be held within the flange 24 since the threaded portion 8 of the bolt will not be allowed to escape by the fingers 18. Therefore, maintenance operations can take place with greater assurance and reduced worry that a fastener might inadvertently fall into a very undesirable location, such as into an engine manifold.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. A fastening arrangement for connecting a first member to a second member which has a threaded bore, the arrangement comprising:
    a bolt having a head on one end and an attached shank with a threaded portion;
    a flange connected with the first member, the flange having a support surface for supporting the bolt head, and a bore intersecting the support surface allowing for penetration of the bolt shank, the bore also having at least two radially inward protruding guide means for centering the bolt shank within the bore on a first side of the bore from the support surface, and at least one compliant finger integrally formed and connected with the flange on the first side of the bore from the support surface which by insertion of the bolt is deformed to a position to compliantly bias the bolt shank against at least one of the guides and to also retain the bolt shank within the bore.

2. An arrangement as described in claim 1 wherein there are three guides and three fingers opposing the guides.

3. An arrangement as described in claim 1 wherein the fingers and guides are fabricated from a polymeric material.

4. An arrangement as described in claim 3 wherein the polymeric material is a moldable material.

5. An arrangement as described in claim 1 wherein the finger and guide are adjacent the support surface.

6. An arrangement as described in claim 1 wherein the bore is multi-diametered and the fingers and the guides project from non-common diameter sections of the bore.

7. An arrangement as described in claim 1 wherein the shank has a nonthreaded portion juxtaposed between the head and threaded portion allowing for freer axial travel of the shank through the bore of the flange when the threaded portion of the shank has passed a point of contact with the finger.

8. An arrangement as described in claim 1 wherein the finger is at a 65 degree angle with the bore plus or minus 10 degrees before insertion of the bolt.

9. A fastening arrangement for connecting a first member to a second member which has a threaded bore, the arrangement comprising:
    a threaded bolt having a head on one end and attached shank with threaded portion;
    a flange integrally formed and connected with the first member, the flange having a support surface for supporting the bolt head in a multi-diametered bore intersecting the support surface allowing for penetration of the bolt shank, the flange bore also having, on a first side of the bore from the support surface, three geometrically spaced guide rings projecting from a common first diameter of the bore for centering the bolt shank within the bore and, opposing each guide means on the first side of the support surface, a compliant finger which projects at an angle of 65 degrees plus or minus 10 degrees from a second diameter of the bore greater than the first diameter bore, the guides and compliant fingers both being integrally formed with the flange and being formed of a moldable polymeric material; and
    whereby insertion of the bolt shank causes the fingers to be deformed within the bore to be positioned to compliantly bias the bolt shank against the corresponding guide and also retain the bolt shank from withdrawal from the bore.

* * * * *